United States Patent [19]

Matsuda

[11] Patent Number: 5,367,935
[45] Date of Patent: Nov. 29, 1994

[54] TURRET PUNCH PRESS
[75] Inventor: Morikatsu Matsuda, Isehara, Japan
[73] Assignee: Amada Company, Limited, Kanagawa, Japan
[21] Appl. No.: 949,884
[22] PCT Filed: Jun. 4, 1991
[86] PCT No.: PCT/JP91/00748
    § 371 Date: Nov. 27, 1992
    § 102(e) Date: Nov. 27, 1992
[87] PCT Pub. No.: WO91/18690
    PCT Pub. Date: Dec. 12, 1991
[30] Foreign Application Priority Data
    Jun. 4, 1990 [JP] Japan .................. 2-144509
[51] Int. Cl.⁵ .................. B21D 28/26; B21J 13/04
[52] U.S. Cl. .................. 83/552; 72/446; 83/563; 483/28
[58] Field of Search .......... 83/552, 563, 698; 72/446, 448; 483/28

[56] References Cited
U.S. PATENT DOCUMENTS

Re. 31,042  9/1982  Clark et al. ............... 219/121 L G
3,991,602  11/1976  Harcuba et al. ............ 72/455
4,423,546  1/1984  Scott et al. ............... 72/446 X
4,624,044  11/1986  Bredow et al. ............. 72/446 X
4,907,480  3/1990  Kuroyone .................. 83/552

FOREIGN PATENT DOCUMENTS 0038199  10/1981  European Pat. Off. .
0310908   4/1989  European Pat. Off. .
63-26225  2/1988  Japan .

Primary Examiner—William Briggs
Attorney, Agent, or Firm—Sandler Greenblum & Bernstein

[57] ABSTRACT

In order to change punches and dies on upper and lower turrets during punching operation on a workpiece, a turret punch press includes a plurality of rotatable holder frames each supporting the upper and lower turret. Thus, when a first set of upper and lower turrets supported on a first holder frames is located in a working region under a striker for a punching operation, a second set of upper and lower turrets supported on a second holder frame is located in a position outside the working region, whereby a punch and die supported on the second set of the turrets can be changed for another punch and die during punching operation. In the preferable embodiment, the holder frame is removably supported on a main frame of the turret punch press, whereby the holder frame can be changed for another holder frame during punching operation.

9 Claims, 3 Drawing Sheets

TURRET PUNCH PRESS

BACKGROUND OF THE INVENTION

1. Field of the Invention

The present invention relates to a turret punch press, and, in particular, to a turret punch press on which is mounted a plurality of turrets.

2. Description of the Prior Art

As is commonly known, a conventional turret punch press comprises: a C-shaped frame integrally provided with an upper frame and a lower frame; a workpiece transfer and positioning device supported in a freely transferable manner in the X-axis and Y-axis directions on the frame, a plate-shaped workpiece which is to be transferred and positioned in the X-axis and Y-axis direction; a plurality of freely rotatable upper turrets, each of which supports a plurality of punches for punching the workpiece; a plurality of lower turrets, each of which supports a plurality of dies in opposition to the above-mentioned punches; and a striker provided with free vertical motion on the frame for striking the punches.

In a turret punch press with such a configuration the number of punches and dies which can be mounted at one time on the upper and lower turrets is limited, which imposes limitations on the processing.

Accordingly, in recent years, in order to increase the variety of processing, technology has been developed for automatically mounting/dismounting and changing the punches and dies on the upper and lower turrets, using an automatic tool changing device, for example, as disclosed in US Pat. No. 4624044 and in Japanese Laid open Patent Application No. 63-26225.

However, in this conventional technology, the problem arises that, when the punches and dies are changed on the upper and lower turrets of the turret punch press, the punching operation on the plate-shaped workpiece must be halted, to the detriment of the operating efficiency.

SUMMARY OF THE INVENTION

A first object of the present invention is to provide, with due consideration to the drawbacks of such conventional methods, a turret punch press on which a punch and a die mounted on opposing upper and lower turrets can be readily mounted or dismounted even while a punching operation is being performed on a workpiece.

A second object of the present invention is to provide a turret punch press on which a punch and a die mounted on opposing upper and lower turrets can be readily mounted or dismounted even while a punching operation is being performed on a workpiece, and which can also perform processes other than the punching of a workpiece.

These objects are achieved in the present invention by the provision of a turret punch press provided with a plurality of upper arms, each of which supports an upper turret in a freely rotatable manner, and a plurality of lower arms, each of which supports a lower turret in a freely rotatable manner, on a holder frame which is supported in a freely swinging manner on a frame on the turret punch press.

Accordingly, by means of the present invention, during a punching operation which is being performed on a workpiece using the punches and dies mounted on the upper and lower turrets, while the one set of upper and lower turrets is supported in a freely rotatable manner on one set of upper and lower arms on a holder frame and positioned at the processing region, it is possible to perform the mounting/dismounting and changing of the punches and dies on another set of upper and lower turrets which are supported in a freely rotatable manner on another set of upper and lower arms.

Accordingly, it is possible to perform, with greater efficiency, a punching process by means of a greater number of punches and dies, wherein, after completion of the punching process by the punches and dies mounted on one set of upper and lower turrets, the holder frame is revolved so that it becomes possible to perform a punching process by means of another set of punches and dies mounted on another upper and lower turrets, by positioning this other set of upper and lower turrets at the processing region.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Figure 1:
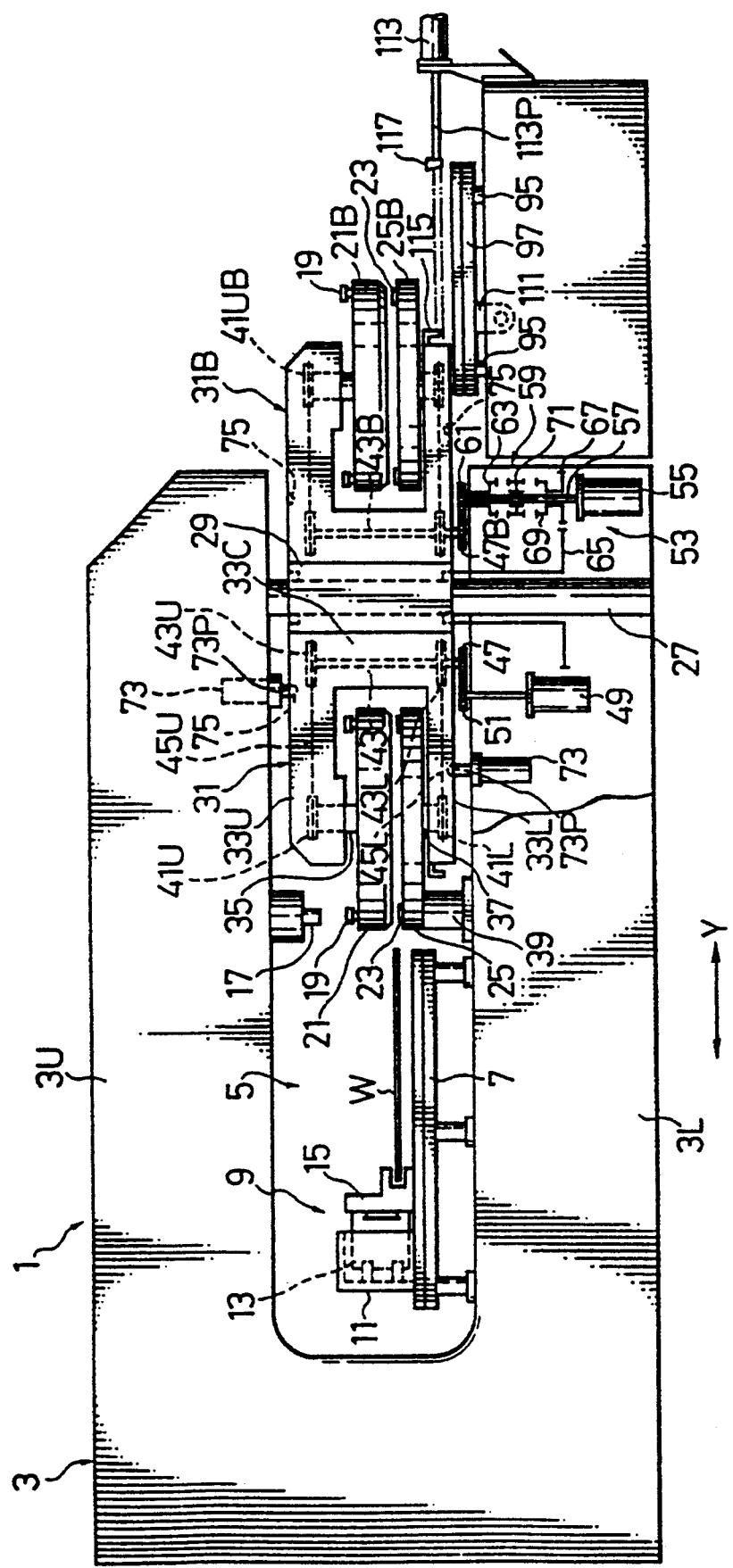
FIG. 1 is a schematic side elevation, for explanatory purposes, which functionally represents an embodiment of a turret punch press of the present invention.

Now referring to FIG. 1, an embodiment of a turret punch press 1 of the present invention is formed in a C-shape and is provided with a frame 3 which comprises an upper frame 3U and a lower frame 3L.

An opening 5 is formed between the upper frame 3U and the lower frame 3L of the frame 3. A workpiece table 7 for supporting a plate-shaped workpiece 7 is provided within the opening 5, and a workpiece transfer and positioning device 9 is provided for transferring and positioning the workpiece W in the X-axis and the Y-axis directions.

The configuration of the workpiece transfer and positioning device 9 is almost identical to that of a commonly known workpiece transfer and positioning device for a turret punch press, therefore only a brief description will be presented here. Specifically, the workpiece transfer and positioning device 9 is provided with a carriage base 11 which can be freely transferred in the Y-axis direction, guided by a Y-axis direction guide rail (omitted from the drawings), by means of a Y-axis motor (also omitted from the drawings). The carriage base 11 extends in the X-axis direction on the workpiece table 7, and a carriage 13 is supported on the carriage base 11 in a freely transferable manner in the X-axis direction by means of an X-axis motor (omitted from the drawings) provided on the carriage base 11. A plurality of workpiece clamps 15 for freely clamping the workpiece W is provided in a freely positional adjustable manner on the carriage 13.

As has already been explained, with the workpiece transfer and positioning device 9, as is commonly known, after the workpiece W has been clamped in the workpiece clamps 15 the carriage base 11 is moved and positioned in the Y-axis direction, and the carriage 13 is moved and positioned along the carriage base 11 in the X-axis direction, so that the workpiece W can be suitably transferred and positioned.

Because the structure of the workpiece transfer and positioning device 9, as previously stated, is commonly known, a further detailed explanation of the structure and operation is omitted.

As is commonly known, a striker 17 for freely striking a punch, which will be later explained, is provided on the upper frame 3U of the turret punch press 1 in a manner allowing free movement in the vertical direction. A crank mechanism or hydraulic cylinder, for example, actuates this vertical movement of the striker 17, but because the structure of such mechanisms is well known, a detailed description of the operation of the striker is omitted.

A disk-shaped upper turret 21 and a lower turret 25 are provided in a freely rotatable manner in the opening 5 in the frame 3 for performing a punching operation on the workpiece; specifically, the upper turret 21 supports a plurality of punches 19, freely mountable and dismountable for changing, and the lower turret 23 supports a plurality of dies 23, each of which can be freely mounted or dismounted for changing in opposition to each of the punches 19.

More specifically, at the end section of the opening 5 in the frame 3, a tie-rod-shaped vertical shaft 27 is provided, one end of which is secured to the upper part of the end section of the upper frame 3U and the other end which secured to the end section of the lower frame 3L. Also, a holder frame 31 is integrally mounted on a side surface of a rotary frame 29 with a multiform cross section (square, in this embodiment) supported in a freely rotatable manner on the vertical shaft 27.

The holder frame 31 is C-shaped and provided with an upper arm 33U on the upper section of a column part 33C, and with a lower 33L on the lower section of the column part 33C. The upper turret 21 is supported in a freely rotatable manner on the end part of the upper arm 33U through an upper shaft 35, and the lower turret 25 is supported in a freely rotatable manner on the end part of the lower arm 33L through a lower shaft 37.

Accordingly, within the processing region, the upper turret 21 and the lower turret 25 are suitably rotated, and after the desired punch 19 and the die 23 are set in the processing position under the striker 17, the workpiece W is suitably positioned in the X- and Y-axis directions by means of the workpiece transfer and positioning device 9, so that the workpiece W can be punched with the desired punch 19 and the die 23 by striking the punch 19 with the striker 17.

A turret support member 39 is provided on the lower frame 3L positioned under the striker 17, for supporting the lower turret 25 from below during the punching operation. Accordingly, the turret support member 39 prevents the lower turret 25 from being bent downward when the punch 19 is struck by the striker 17 to perform the punching operation.

An upper sprocket 41U is mounted on the upper shaft 35 of the upper turret 21, and a lower sprocket 41L is mounted on the lower shaft 37 of the lower turret 25 for rotating the upper and lower turrets 21, 25. An endless upper chain 45U is fitted around an upper sprocket 43U, mounted on the upper part of a rotary shaft 43 which is supported in a freely rotatable manner on the column part 33C of the holder frame 31, and around the upper sprocket 41U. In addition, a lower chain 45L is fitted around a lower sprocket 43L, mounted on the lower part of the rotary shaft 43 and around the lower sprocket 41L. A follower gear 47 for rotating the rotary shaft 43 is mounted on the lower end of the rotary shaft 43, and a drive gear 51 mounted on a servomotor 49 provided on the lower frame 31 engages the follower gear 47 in a freely disengageable manner. The drive gear 51 and the follower gear 47 are engaged and disengaged by swinging the rotary frame 29 around the vertical shaft 27. Engagement occurs when the follower gear 47 is arranged in a position corresponding with the drive gear 51, and disengagement occurs when the follower gear 47 is removed from the drive gear 51 by swinging the rotary frame 29.

As can be readily understood from the foregoing explanation, when the drive gear 51 of the servomotor 49 and the follower gear 47 are in the engaged state, the upper and lower turrets 21, 25 are rotated simultaneously in the same direction, suitably driven by the servomotor 49, and the desired punch 19 and die 23 can be positionally indexed at the position under the striker 17, supported on the upper and lower turrets 21, 25.

In order to utilize a larger number of punches 19 and dies 28, a second holder frame 31B is mounted in a freely mountable/dismountable manner on the rotary frame 29. More specifically, the second frame 31B the shape of which is symmetrical with the first holder frame 31B, is symmetrically positioned with the first holder frame 31 with the vertical shaft 27 between them. Accordingly, the same reference numerals used for the first holder frame 31 are also used for the second holder frame 31B with the suffix B added, so a more detailed explanation of the second holder frame 31B is omitted.

A rotating indexing drive device 53 is provided on the lower frame 3L of the frame 3 to switch tile positions of the first holder frame 31 and the second holder frame 31B, and also to rotate a pair of upper and lower turrets 21B, 25B which are supported by the second holder frame 31B.

More specifically, a drive motor 55 is mounted on the lower frame 3L, symmetrically positioned with the servomotor 49 around the vertical shaft 27. A clutch device 59 which freely transmits/interrupts the rotation to the rotary frame 29 and to the upper and lower turrets 21B, 25B which are supported on the second holder frame 31B, is provided on an output shaft 57 of the drive motor 55.

Specifically, a first drive gear 61, which freely engages a follower gear 47B mounted on a rotary shaft 43B supported on the second holder frame 31B, is provided on the upper portion of the output shaft 57 of the drive motor 55, and a first clutch plate 63 is integrally provided on the first drive gear 61. In addition, a second drive gear 67, which engages a swing gear 65 integrally provided on the rotary frame 29, is supported in a freely rotatable manner on the lower part of the output shaft 57, and a second clutch plate 69 is integrally provided on the second drive gear 67. Further, a clutch switching plate 71 is provided between the first clutch plate 63 and the second clutch plate 69, rotating integrally with the output shaft 57 but free to move in the axial direction of the output shaft 57. The switching of the clutch switching plate 71 is performed by either manual or automatic operation of a shift lever (omitted from the drawings).

As can be understood from the foregoing, the clutch change plate 71 is operated so that, by the connection or engaging of the clutch change plate 71 and the first clutch plate 63, the rotation of the drive motor 55 is transmitted to the upper and lower turrets 21B, 25B supported on the second holder frame 31B. Accordingly, during the performance of a punching operation on the workpiece W, using the punches 19 and the dies 23 provided on the upper and lower turrets 21, 25 supported on the first holder frame 31, the upper and lower turrets 21B, 25B are suitably rotated, supported on the second holder frame 31B, the punches 19 and the dies 23 on the upper and lower turrets 21B, 25B are changed, and the arrangements are made for the next process.

The first holder frame 31 and the second holder frame 31B are exchanged by means of the rotational drive of the drive motor 55 after the clutch switching plate 71 on the clutch device 59 is switched downward, and the clutch switching plate 71 and the second clutch plate 69 are in contact or engaged. In this case, the follower gear 47 supported on the first holder frame 31 side is disengaged from the drive gear 51 of the servomotor 49 and engaged with the first drive gear 61 of the clutch device 59 by swinging the rotating frame 29. On the other hand, the follower gear 47B, which is supported on the second holder frame 31 side, is disengaged from the first drive gear 61 of the clutch device 59 and engaged with the drive gear 51 of the servomotor 49.

Accordingly, after the first holder frame 31 and the second holder frame 31B are exchanged by swinging the rotating frame 29, the workpiece W can be punched by using the punches 19 and the dies 23 provided on the upper and lower turrets 21B, 25B supported on the second holder frame 31B; in addition, It is possible to change the punches 19 and the dies 23 which are on the upper and lower turrets 21, 25 supported on the first holder frame 31.

Accordingly, by means of this embodiment of the present invention, when the upper and lower turrets 21, 25 supported on the one holder frame 31 are positioned in the processing region, and the workpiece W is being punched using the punches 19 and the dies 23 mounted on the upper and lower turrets 21, 25, it is possible to change the punches and dies 19, 23 on the upper and lower turrets 21B, 25B supported on the other holder frame 31B in preparation for the next punching operation. Therefore, the operating efficiency of preparing for and performing the various punching operations can be improved, which is very effective with respect to multivariety, small volume processing.

In order to positionally index a holder frame such as the holder frames 31, 31b in the processing region, a suitable number of shot pin devices 73 are provided in the frame 3, and an engaging hole 75 for engaging with a pin 73P of the shot pin device 73 is provided on each holder frame 31, 31B.

In addition, although a detailed drawing has been omitted, a securing device is provided to maintain the upper and lower turrets 21, 25 in a secured state when the punches 19 and dies 23 mounted on the upper and lower turrets 21, 25 on the holder frames 31, 31B, are positionally indexed under the striker 17. This securing device may be of the same structure as a conventional shot pin device provided on a conventional turret punch press, to position the upper and lower turrets.

Figure 3:
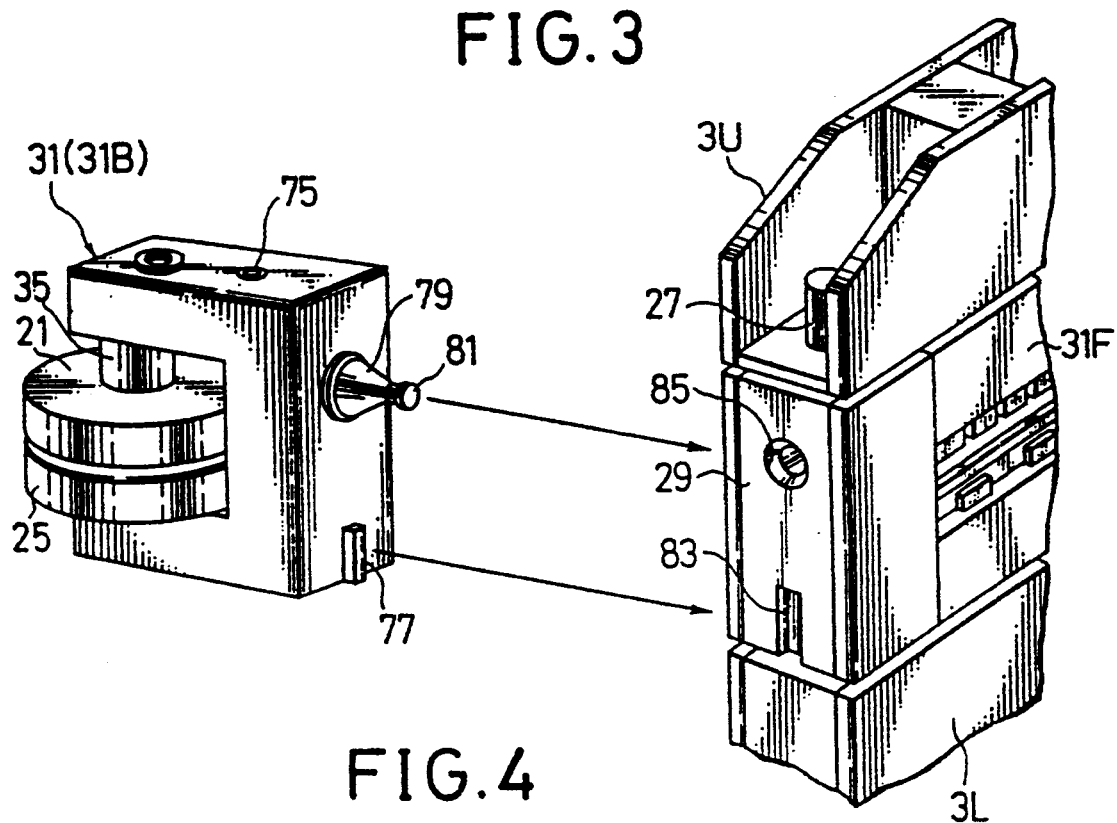
FIG. 3 is a perspective view illustrating the operation for mounting and dismounting a holder frame.
Figure 4:
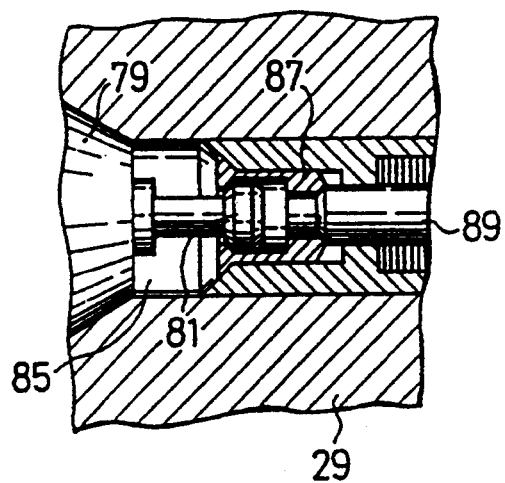
FIG. 4 is a sectional view of the mounting and securing section of the turret punch press.

In order to expand the utilization of tile turret punch press 1, the holder frames 31, 31B are installed on the rotary frame 29 in a freely mountable and dismountable manner. Specifically, as shown in FIG. 3, a positioning key 77 and a tapered shaft 79 are provided on a mounting surface for mounting the holder frames 31, 31B on the rotary frame 29, and a small disk-shaped engaging part 81, for example, is provided on the tip of the tapered shaft 79. A key channel 83, which freely engages/disengages tile positioning key 77 and a tapered hole which is penetrated by the tapered shaft 79 are formed in the mounting surface on the rotary frame 29.

A collet hook 87 for clamping the engaging part 81 is incorporated in a tapered hole 85 formed in the rotary frame 29, to secure the holder frame 31 to the rotary frame 29. The collet hook 87 is mounted on the end of a pull rod 89 which is moved in a reciprocating manner by a hydraulic cylinder (omitted from the drawing) incorporated in the rotary frame 29.

Accordingly, the holder frame 31 can be secured to the rotary frame 29 by engaging the positioning key 77 in the key channel 83 and engaging the tapered shaft 79 in the tapered hole 85, then pulling the pull rod 89 so that the engaging part 81 on the tip of the tapered shaft 79 is clamped by the collet hook 87. Conversely, by pressing the pull rod 89 forward, the engaging part 81 is released from the collet hook 87 so that the holder frame 31 can be removed from the rotary frame 29.

Figure 2:
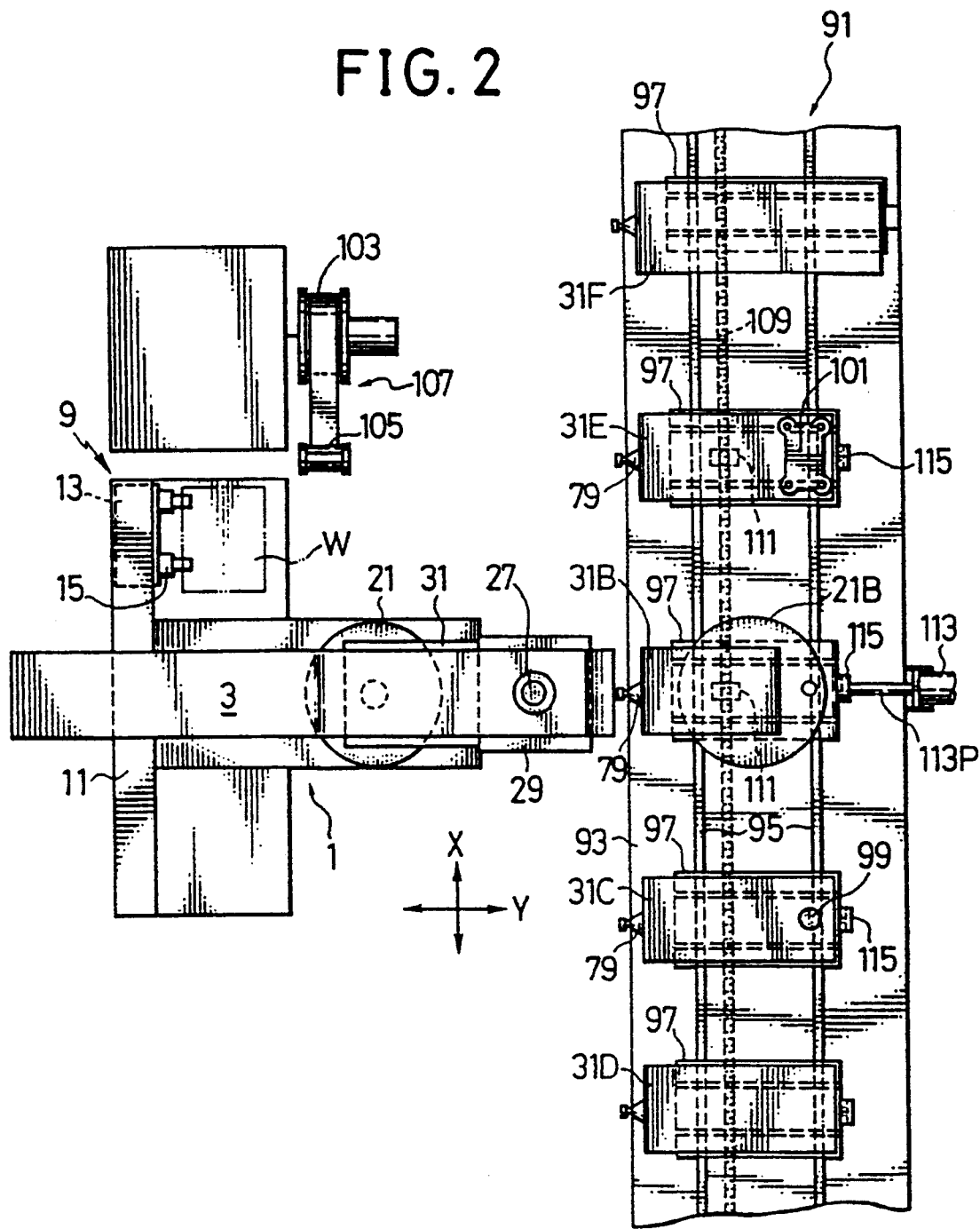
FIG. 2 is a plan view of the same turret punch press.

Referring now to FIG. 2, in order to provide various types of holder frames which can be changed by mounting/dismounting on the rotary frame 29 of the turret punch press 21, a tool housing device 91 is positioned at the front of the turret punch press 21 to house and support various types of holder frames.

More specifically, a supporting base 93 extending in the X-axis direction is provided at the front of the turret punch press 21. A plurality of sliding member 97 are supported for moving in the X-axis direction on a guide rail 95 provided on the supporting base 93. Various types of freely exchangeable holder frames 31B, 31C, . . . 31F, are supported in a freely mountable/dismountable manner on each of the sliding members 97.

A laser process head 99 from which a laser beam from a laser generating device is introduced to perform a laser process on the workpiece W is supported on the holder frame 31C, and a forming mold for carrying out a forming process on the workpiece W is supported on the holder frame 31D. In addition, a progressive die 101 for carrying out a progressive process in a coil strip is mounted on the holder frame 31E, and when the progressive die 101 is used, a coil strip feeder device 107 provided in a position beside the worktable 7 is used for feeding the coil strip into the press 21, the coil strip feeder device generally including an uncoiler 103 or a leveller 105 or the like. Also, a bending tool for bending the workpiece W is mounted on the holder frame 31F.

A freely rotatable ball screw 109 extending parallel to the guide rail 105 is provided to move the sliding members 97 along the guide rail 95. A ball nut 111 mounted on the sliding member 97 is engaged by the ball screw 109. Accordingly, the sliding member 97 can be moved along the guide rail 95 by the suitable rotation of the screw 109 by a motor (omitted from the drawings), making it possible to positionally index the sliding member 97 in front of the turret punch press 1.

A push-pull cylinder 113 is mounted on the supporting base 93 for moving the holder frames 31, 31B . . . from the sliding member 97 to the rotary frame 29, so that the holder frames 31, 31B . . . are mounted on the rotary frame 29 and for removing the holder frames from the rotary frame 29. A hook claw 117 is provided on the end of a freely reciprocating piston rod 113P on the push-pull cylinder 113, to releasably engage with a hook part 115 (FIG. 1) mounted on each holder frame 31, 31B. . . . The engagement and disengagement of the hook claw 117 with the hook part 115 is effected by rotating the hook claw 117 or the hook part 115 by means of a suitable actuator (omitted from the drawings).

As can be readily understood from the foregoing description, after an empty sliding member 97 is positionally indexed before the turret punch press 1, the hook claw 117 on the end of the piston rod 113P engages the hook part 115 on the holder frame 31, 331B . . . mounted on the rotary frame 29, after which the holder frame mounted on the rotary frame 29 can be installed on the empty sliding member 97 by withdrawing the piston rod 113P.

Next, after another holder frame 31, 31B . . . is positionally indexed before the turret punch press 1, the other holder frame 31, 31B . . . can be mounted on the rotary frame 29 by advancing the other holder frame 31B . . . toward the rotary frame 29 with the piston rod 113P of the push-pull cylinder 113.

Accordingly, by means of this embodiment of the present invention, various types of freely changeable holder frames can be used with the rotary frame 29, and various types of processes such as, for example, a laser process, a forming process, a progressive process, a bending process, and the like, can be performed in addition to the punching process.

As can be understood from the foregoing explanation of the embodiment of the present invention, when a workpiece is punched using the punches and dies mounted on one set of upper and lower turrets, punches and dies mounted on another set of upper and lower turrets can be changed in preparation for the next punching operation, therefore the operating efficiency can be improved.

Also, because it is possible to use changeable holder frames which support various types of tools for performing processes other than the punching process, the general purpose use of the turret punch press is improved.

What is claimed is:

1. A turret punch press comprising:
   a C-shaped frame having an upper frame and a lower frame;
   a workpiece transfer and positioning device for supporting a plate-shaped workpiece in a freely transferable manner in the X-axis and Y-axis directions on the frame;
   a plurality of freely rotatable upper turrets, each of which supports a plurality of punches for punching the workpiece, and a plurality of lower turrets, each of which support a plurality of dies to cooperate with the punches, and
   a striker with free vertical motion provided on the frame for striking the punches;
   wherein a freely swinging holder frame, on which a plurality of upper arms and a plurality of lower arms are integrally mounted, is provided on a vertical shaft in the opening in the C-shaped frame, and the freely rotatable upper turrets and freely rotatable lower turrets are respectively provided on each of the upper arms and the lower arms, the vertical shaft having upper and lower ends, each respectively secured to the upper and lower frames of the C-shaped frame.

2. The turret punch press of claim 1 wherein the upper and lower ends of the vertical shaft are supported at the ends of the upper and lower frames respectively of the C-shaped frame.

3. The turret punch press of claim 1, the C-shaped frame including a drive mechanism, selectively engagable with cooperating drive means of the frame holder, for rotating the upper and lower turrets.

4. The turret punch press of claim 1, the frame holder provided with alignment and securing means for cooperating with alignment and securing means on a frame for the upper and lower arms.

5. The turret punch press of claim 1, further comprising positional indexing means, on the C-shaped frame for indexing a rotational position of the holder frame.

6. A turret punch press comprising:
   a C-shaped frame having an upper frame and a lower frame;
   a plurality of rotatable upper turrets, each upper turret supporting a plurality of punches for punching a workpiece, and a plurality of lower turrets, each of said lower turrets supporting a plurality of dies for cooperating with said punches; and
   a striker mounted for vertical movement on the frame and positioned for striking the one of said punches;
   a holder frame, mounted for a swinging movement, is provided with a plurality of upper arms and a plurality of lower arms integrally mounted on the holder frame, said swinging holder frame being mounted on a vertical shaft positioned in an opening of said C-shaped frame, said upper turrets and said lower turrets being respectively provided on each of said upper arms and lower arms of said holder frame, said vertical shaft having upper and lower ends each respectively secured to said upper and lower frames of said C-shaped frame.

7. The turret punch press according to claim 6, said upper and lower ends of the vertical shaft supported adjacent an outwardmost portion of an open end of said upper and lower frames, respectively, of said C-shaped frame.

8. The turret punch press according to claim 6, said vertical shaft spanning an opening between said upper and lower frames of said C-shaped frame.

9. The turret punch press according to claim 6, said swinging frame holder being mounted for rotation about said vertical shaft.

* * * * *